US008442197B1

(12) United States Patent
Mazza et al.

(10) Patent No.: US 8,442,197 B1
(45) Date of Patent: May 14, 2013

(54) TELEPHONE-BASED USER INTERFACE FOR PARTICIPATING SIMULTANEOUSLY IN MORE THAN ONE TELECONFERENCE (75) Inventors: Bruce P. Mazza, Thornton, CO (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 1219 days.

(21) Appl. No.: 11/395,558

(22) Filed: Mar. 30, 2006

(51) Int. Cl.
*H04M 3/56* (2006.01)
*H04L 12/18* (2006.01)
*G06F 3/00* (2006.01)

(52) U.S. Cl.
USPC .......... 379/202.01; 370/260; 379/88.01; 379/207.01; 379/914; 379/915; 379/916; 455/416; 715/700

(58) Field of Classification Search .......... 379/201.01–206.01, 88.14, 207.01, 914–916; 455/414.1–417; 370/260; 715/700
See application file for complete search history.

(56) References Cited

U.S. PATENT DOCUMENTS

| 4,163,124 A | 7/1979 | Jolissaint |
| 4,567,323 A | 1/1986 | Lottes et al. |
| 4,737,983 A | 4/1988 | Frauenthal et al. |
| 4,777,469 A | 10/1988 | Engelke et al. |
| 4,797,911 A | 1/1989 | Szlam et al. |
| 4,894,857 A | 1/1990 | Szlam et al. |
| 4,897,868 A | 1/1990 | Engelke et al. |
| 4,953,159 A | 8/1990 | Hayden et al. |
| 4,959,847 A | 9/1990 | Engelke et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,983 A | 11/1992 | Brown et al. |
| 5,206,903 A | 4/1993 | Kohler et al. |
| 5,210,789 A | 5/1993 | Jeffus et al. |
| 5,274,700 A | 12/1993 | Gechter et al. |
| 5,278,898 A | 1/1994 | Cambray et al. |
| 5,291,550 A | 3/1994 | Levy et al. |
| 5,299,260 A | 3/1994 | Shaio |
| 5,309,513 A | 5/1994 | Rose |
| 5,325,417 A | 6/1994 | Engelke et al. |
| 5,327,479 A | 7/1994 | Engelke et al. |
| 5,335,268 A | 8/1994 | Kelly, Jr. et al. |
| 5,335,269 A | 8/1994 | Steinlicht |
| 5,351,288 A | 9/1994 | Engelke et al. |
| 5,390,243 A | 2/1995 | Casselman et al. |

(Continued)

FOREIGN PATENT DOCUMENTS

| CA | 2143198 | 1/1995 |
| CA | 2174762 | 3/1996 |

(Continued)

OTHER PUBLICATIONS

U.S. Appl. No. 12/241,988, filed Sep. 30, 2008, Katz.

(Continued)

*Primary Examiner* — Harry Hong
(74) *Attorney, Agent, or Firm* — Sheridan Ross P.C.

(57) ABSTRACT

The present invention is directed, in one embodiment, to the simultaneous streaming of a text representation of a first voice stream from a first call to a telephone for display and transmitting of a second voice stream from a second call to the telephone for audible play to the user.

22 Claims, 4 Drawing Sheets

U.S. PATENT DOCUMENTS

| | | | |
|---|---|---|---|
| 5,432,837 A | 7/1995 | Engelke et al. | |
| 5,436,965 A | 7/1995 | Grossman et al. | |
| 5,444,774 A | 8/1995 | Friedes | |
| 5,469,503 A | 11/1995 | Butensky et al. | |
| 5,469,504 A | 11/1995 | Blaha | |
| D364,865 S | 12/1995 | Engelke et al. | |
| 5,473,773 A | 12/1995 | Aman et al. | |
| 5,479,497 A | 12/1995 | Kovarik | |
| 5,500,795 A | 3/1996 | Powers et al. | |
| 5,504,894 A | 4/1996 | Ferguson et al. | |
| 5,506,898 A | 4/1996 | Costantini et al. | |
| 5,530,744 A | 6/1996 | Charalambous et al. | |
| 5,537,470 A | 7/1996 | Lee | |
| 5,537,542 A | 7/1996 | Eilert et al. | |
| 5,544,232 A | 8/1996 | Baker et al. | |
| 5,546,452 A | 8/1996 | Andrews et al. | |
| 5,581,593 A | 12/1996 | Engelke et al. | |
| 5,592,378 A | 1/1997 | Cameron et al. | |
| 5,592,542 A | 1/1997 | Honda et al. | |
| 5,594,726 A | 1/1997 | Thompson et al. | |
| 5,604,786 A | 2/1997 | Engelke et al. | |
| 5,606,361 A | 2/1997 | Davidsohn et al. | |
| 5,611,076 A | 3/1997 | Durflinger et al. | |
| 5,627,884 A | 5/1997 | Williams et al. | |
| 5,642,515 A | 6/1997 | Jones et al. | |
| 5,653,242 A | 8/1997 | Brockelsby | |
| 5,684,872 A | 11/1997 | Flockhart et al. | |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,724,092 A | 3/1998 | Davidsohn et al. | |
| 5,724,405 A | 3/1998 | Engelke et al. | |
| 5,740,238 A | 4/1998 | Flockhart et al. | |
| 5,742,675 A | 4/1998 | Kilander et al. | |
| 5,745,711 A | 4/1998 | Kitahara et al. | |
| 5,748,468 A | 5/1998 | Notenboom et al. | |
| 5,749,079 A | 5/1998 | Yong et al. | |
| 5,751,707 A | 5/1998 | Voit et al. | |
| 5,752,027 A | 5/1998 | Familiar | |
| 5,754,639 A | 5/1998 | Flockhart et al. | |
| 5,754,776 A | 5/1998 | Hales et al. | |
| 5,754,841 A | 5/1998 | Carino, Jr. | |
| 5,757,904 A | 5/1998 | Anderson | |
| 5,790,677 A | 8/1998 | Fox et al. | |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,809,425 A | 9/1998 | Colwell et al. | |
| 5,818,907 A | 10/1998 | Maloney et al. | |
| 5,825,869 A | 10/1998 | Brooks et al. | |
| 5,828,747 A | 10/1998 | Fisher et al. | |
| 5,838,968 A | 11/1998 | Culbert | |
| 5,839,117 A | 11/1998 | Cameron et al. | |
| 5,862,519 A | 1/1999 | Sharma et al. | |
| 5,875,437 A | 2/1999 | Atkins | |
| 5,880,720 A | 3/1999 | Iwafune et al. | |
| 5,881,238 A | 3/1999 | Aman et al. | |
| 5,884,032 A | 3/1999 | Bateman et al. | |
| 5,889,956 A | 3/1999 | Hauser et al. | |
| 5,897,622 A | 4/1999 | Blinn et al. | |
| 5,903,641 A | 5/1999 | Tonisson | |
| 5,903,877 A | 5/1999 | Berkowitz et al. | |
| 5,905,793 A | 5/1999 | Flockhart et al. | |
| 5,909,482 A | 6/1999 | Engelke | |
| 5,915,012 A | 6/1999 | Miloslavsky | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandilt | |
| 5,940,496 A | 8/1999 | Gisby et al. | |
| 5,943,416 A | 8/1999 | Gisby | |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | |
| 5,970,132 A | 10/1999 | Brady | |
| 5,974,116 A | 10/1999 | Engelke et al. | |
| 5,974,135 A | 10/1999 | Breneman et al. | |
| 5,974,462 A | 10/1999 | Aman et al. | |
| 5,978,654 A | 11/1999 | Colwell et al. | |
| 5,982,873 A | 11/1999 | Flockhart et al. | |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | |
| 6,011,844 A | 1/2000 | Uppaluru et al. | |
| 6,038,293 A | 3/2000 | Mcnerney et al. | |
| 6,044,144 A | 3/2000 | Becker et al. | |
| 6,044,205 A | 3/2000 | Reed et al. | |
| 6,044,355 A | 3/2000 | Crockett et al. | |
| 6,049,547 A | 4/2000 | Fisher et al. | |
| 6,052,723 A | 4/2000 | Ginn | |
| 6,055,308 A | 4/2000 | Miloslavsky et al. | |
| 6,064,730 A | 5/2000 | Ginsberg | |
| 6,064,731 A | 5/2000 | Flockhart et al. | |
| 6,075,841 A | 6/2000 | Engelke et al. | |
| 6,075,842 A | 6/2000 | Engelke et al. | |
| 6,084,954 A | 7/2000 | Harless | |
| 6,088,441 A | 7/2000 | Flockhart et al. | |
| 6,115,462 A | 9/2000 | Servi et al. | |
| 6,151,571 A | 11/2000 | Pertrushin | |
| 6,154,769 A | 11/2000 | Cherkasova et al. | |
| 6,163,607 A | 12/2000 | Bogart et al. | |
| 6,173,053 B1 | 1/2001 | Bogart et al. | |
| 6,175,564 B1 | 1/2001 | Miloslavsky et al. | |
| 6,178,441 B1 | 1/2001 | Elnozahy | |
| 6,185,292 B1 | 2/2001 | Miloslavsky | |
| 6,192,122 B1 | 2/2001 | Flockhart et al. | |
| 6,215,865 B1 | 4/2001 | McCalmont | |
| 6,226,377 B1 | 5/2001 | Donaghue, Jr. | |
| 6,229,819 B1 | 5/2001 | Darland et al. | |
| 6,230,183 B1 | 5/2001 | Yocom et al. | |
| 6,233,314 B1 | 5/2001 | Engelke | |
| 6,233,333 B1 | 5/2001 | Dezonmo | |
| 6,240,417 B1 | 5/2001 | Eastwick | |
| 6,259,969 B1 | 7/2001 | Tackett et al. | |
| 6,263,066 B1 | 7/2001 | Shtivelman et al. | |
| 6,263,359 B1 | 7/2001 | Fong et al. | |
| 6,272,544 B1 | 8/2001 | Mullen | |
| 6,275,806 B1 | 8/2001 | Pertrushin | |
| 6,275,812 B1 | 8/2001 | Haq et al. | |
| 6,275,991 B1 | 8/2001 | Erlin | |
| 6,278,777 B1 | 8/2001 | Morley | |
| 6,292,550 B1 | 9/2001 | Burritt | |
| 6,295,353 B1 | 9/2001 | Flockhart et al. | |
| 6,307,921 B1 | 10/2001 | Engelke et al. | |
| 6,353,810 B1 | 3/2002 | Petrushin | |
| 6,356,632 B1 | 3/2002 | Foster et al. | |
| 6,356,633 B1 | 3/2002 | Armstrong | |
| 6,366,668 B1 | 4/2002 | Borst et al. | |
| 6,389,028 B1 | 5/2002 | Bondarenko et al. | |
| 6,389,132 B1 | 5/2002 | Price | |
| 6,389,400 B1 | 5/2002 | Bushey et al. | |
| 6,424,709 B1 | 7/2002 | Doyle et al. | |
| 6,426,950 B1 | 7/2002 | Mistry | |
| 6,427,137 B2 | 7/2002 | Petrushin | |
| 6,430,282 B1 | 8/2002 | Bannister et al. | |
| 6,434,230 B1 | 8/2002 | Gabriel | |
| 6,449,356 B1 | 9/2002 | Dezonno | |
| 6,449,358 B1 | 9/2002 | Anisimov et al. | |
| 6,449,646 B1 | 9/2002 | Sikora et al. | |
| 6,453,038 B1 | 9/2002 | McFarlane et al. | |
| 6,463,148 B1 | 10/2002 | Brady | |
| 6,463,346 B1 | 10/2002 | Flockhart et al. | |
| 6,463,415 B2 | 10/2002 | St. John | |
| 6,480,826 B2 | 11/2002 | Pertrushin | |
| 6,490,350 B2 | 12/2002 | McDuff et al. | |
| 6,493,426 B2 | 12/2002 | Engelke et al. | |
| 6,510,206 B2 | 1/2003 | Engelke et al. | |
| 6,535,600 B1 | 3/2003 | Fisher et al. | |
| 6,535,601 B1 | 3/2003 | Flockhart et al. | |
| 6,549,611 B2 | 4/2003 | Engelke et al. | |
| 6,560,330 B2 | 5/2003 | Gabriel | |
| 6,560,649 B1 | 5/2003 | Mullen et al. | |
| 6,560,707 B2 | 5/2003 | Curtis et al. | |

| | | | |
|---|---|---|---|
| 6,563,920 B1 | 5/2003 | Flockhart et al. | |
| 6,567,503 B2 | 5/2003 | Engelke et al. | |
| 6,594,346 B2 | 7/2003 | Engelke | |
| 6,597,685 B2 | 7/2003 | Miloslavsky et al. | |
| 6,603,835 B2 | 8/2003 | Engelke et al. | |
| 6,614,903 B1 | 9/2003 | Flockhart et al. | |
| 6,650,748 B1 | 11/2003 | Edwards et al. | |
| 6,697,457 B2 | 2/2004 | Petrushin | |
| 6,704,409 B1 | 3/2004 | Dilip et al. | |
| 6,707,903 B2 | 3/2004 | Burok et al. | |
| 6,714,976 B1 | 3/2004 | Wilson et al. | |
| 6,728,934 B1* | 4/2004 | Scopes | 715/205 |
| 6,754,333 B1 | 6/2004 | Flockhart et al. | |
| 6,766,013 B2 | 7/2004 | Flockhart et al. | |
| 6,766,014 B2 | 7/2004 | Flockhart et al. | |
| 6,816,468 B1* | 11/2004 | Cruickshank | 370/260 |
| 6,882,707 B2 | 4/2005 | Engelke et al. | |
| 6,934,366 B2 | 8/2005 | Engelke et al. | |
| 6,947,543 B2 | 9/2005 | Alvarado et al. | |
| 7,003,082 B2 | 2/2006 | Engelke et al. | |
| 7,006,604 B2 | 2/2006 | Engelke | |
| 7,035,927 B2 | 4/2006 | Flockhart et al. | |
| 7,088,812 B1* | 8/2006 | Atwood et al. | 379/220.01 |
| 7,133,513 B1* | 11/2006 | Zhang | 379/202.01 |
| 7,236,580 B1* | 6/2007 | Sarkar et al. | 379/202.01 |
| 2002/0055950 A1* | 5/2002 | Witteman | 707/500.1 |
| 2002/0087579 A1 | 7/2002 | Chasanoff et al. | |
| 2002/0124051 A1 | 9/2002 | Ludwig et al. | |
| 2002/0124053 A1 | 9/2002 | Adams et al. | |
| 2002/0161578 A1* | 10/2002 | Saindon et al. | 704/235 |
| 2002/0194002 A1 | 12/2002 | Petrushin | |
| 2003/0038754 A1* | 2/2003 | Goldstein et al. | 345/7 |
| 2003/0126141 A1 | 7/2003 | Hassman et al. | |
| 2003/0167276 A1* | 9/2003 | Simpson et al. | 707/102 |
| 2003/0174826 A1 | 9/2003 | Hesse | |
| 2003/0174830 A1 | 9/2003 | Boyer et al. | |
| 2003/0177017 A1 | 9/2003 | Boyer et al. | |
| 2003/0227478 A1 | 12/2003 | Chatfield | |
| 2004/0002049 A1* | 1/2004 | Beavers et al. | 434/350 |
| 2004/0058694 A1 | 3/2004 | Mendiola et al. | |
| 2004/0081292 A1* | 4/2004 | Brown et al. | 379/68 |
| 2004/0081293 A1 | 4/2004 | Brown et al. | |
| 2004/0125932 A1 | 7/2004 | Orbach et al. | |
| 2004/0199580 A1 | 10/2004 | Zhakov et al. | |
| 2004/0203878 A1 | 10/2004 | Thomson | |
| 2005/0053214 A1* | 3/2005 | Reding et al. | 379/202.01 |
| 2005/0084086 A1 | 4/2005 | Hesse | |
| 2005/0188412 A1* | 8/2005 | Dacosta | 725/110 |
| 2005/0232169 A1* | 10/2005 | McLaughlin et al. | 370/261 |
| 2005/0283752 A1 | 12/2005 | Fruchter | |
| 2006/0149815 A1 | 7/2006 | Spradling et al. | |
| 2007/0033003 A1 | 2/2007 | Morris | |
| 2007/0118433 A1 | 5/2007 | Bess | |
| 2007/0127645 A1 | 6/2007 | Bloebaum et al. | |
| 2007/0195940 A1 | 8/2007 | Miloslavsky et al. | |
| 2007/0244895 A1 | 10/2007 | Mohler et al. | |
| 2007/0299838 A1 | 12/2007 | Behrens | |
| 2008/0005072 A1 | 1/2008 | Meek et al. | |
| 2008/0005249 A1 | 1/2008 | Hart | |
| 2008/0062895 A1 | 3/2008 | Chapman et al. | |
| 2008/0147722 A1 | 6/2008 | Dolin et al. | |
| 2008/0215614 A1 | 9/2008 | Slattery | |

FOREIGN PATENT DOCUMENTS

| | | |
|---|---|---|
| EP | 0501189 | 9/1992 |
| EP | 0740450 | 10/1996 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 899673 | 3/1999 |
| EP | 998108 | 5/2000 |
| EP | 1091307 | 4/2001 |
| EP | 1150236 | 10/2001 |
| EP | 1288795 | 3/2003 |
| EP | 0 899 952 B1 | 6/2003 |
| EP | 1 469 663 A1 | 10/2004 |
| GB | 2273418 | 6/1994 |
| GB | 2290192 | 12/1995 |
| WO | WO 96/07141 | 3/1996 |
| WO | WO 97/28635 | 8/1997 |
| WO | WO 98/56207 | 12/1998 |
| WO | WO 2005/017674 A2 | 2/2005 |
| WO | WO 2006/078683 | 7/2006 |
| WO | WO 2009/041982 | 4/2009 |

OTHER PUBLICATIONS

U.S. Appl. No. 12/270,443, filed Nov. 13, 2008, Kohler et al.
U.S. Appl. No. 12/372,903, filed Feb. 18, 2009, Erhart et al.
U.S. Appl. No. 12/389,240, filed Feb. 19, 2009, Gartner.
U.S. Appl. No. 12/464,659, filed May 12, 2009, Bland et al.
U.S. Appl. No. 12/540,202, filed Aug. 12, 2009, Gartner et al.
"http://en.wikipedia.org/wiki/Conference_Call", Wikipedia, Feb. 25, 2009, Publisher, Wikimedia Foundation, Inc., Published in US.
http://en.wikipedia.org/wiki/Web_conferencing, Wikipedia, Feb. 25, 2009, Publisher: Wikimedia Foundation, Inc., Published in US.
"Answering the Social Phone" Media Philosopher, http://www.mediaphilosopher.com/2008/04/14/answering-the-social-phone/, Apr. 14, 2008, pp. 1-6.
"Applications, NPRI's Predictive Dialing Package," Computer Technology (Fall 1993), p. 86.
"Call Center Software You Can't Outgrow," Telemarketing® (Jul. 1993), p. 105.
"Domain Name Services," available at http://www.pism.com/chapt09/chapt09.html, downloaded Mar. 31, 2003, 21 pages.
"eGain's Commerce 2000 Platform Sets New Standard for eCommerce Customer Communications," Business Wire (Nov. 15, 1999)., 3 pages.
"Internet Protocol Addressing," available at http://samspade.org/d/ipdns.html, downloaded Mar. 31, 2003, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-Athena, Section 5—Company C520, p. 95, 1992.
"The Communications Factors: Comcast is Taking the First Step in the Relationship Economy" http://onthemarkwriting.com/2008/02/20/comcast-is-taking-the-first-step-in-the-relationship-economy/, Feb. 20, 2008, pp. 1-3.
"VAST™, Voicelink Application Software for Teleservicing®," System Manager User's Guide, Digital Systems (1994), pp. ii, vii-ix, 1-2, 2-41 through 2-77.
"Welcome to the Service Cloud" salesforce.com, Copyright 2000-2009.
"When Talk Isn't Cheap," Sm@rt Reseller, v. 3, n. 13 (Apr. 3, 2000), p. 50.
"Word Frequencies in Written and Spoken English" (Andrew Wilson, Geoffery Leech, Paul Rayson, ISBN 0582-32007-0, Prentice Hall, 2001.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Alston, David Consumers are Shouting into your Brand's "Social Phone" http://www.radian6.com/blog/76/comsumers-are-shouting-into-your-band's-%22social-phone%22/, Aug. 19, 2008, pp. 1-2.
Avaya, Inc. Business Advocate Options, at http://www.avaya.com, downloaded on Feb. 15, 2003, Avaya, Inc. 2003.
Avaya, Inc. Business Advocate Product Summary, at http://www.avaya.com, downloaded on Feb. 15, 2003, Avaya, Inc. 2003, 3 pages.
Avaya, Inc. CentreVu Advocate, Release 9, User Guide, Dec. 2000.
Avaya, Inc., "Better Implementation of IP in Large Networks," Avaya, Inc. 2002, 14 pages.
Avaya, Inc., "The Advantages of Load Balancing in the Multi-Call Center Enterprise," Avaya, Inc., 2002, 14 pages.
Avaya, Inc., "Voice Over IP Via Virtual Private Networks: An Overview," Avaya, Inc., Feb. 2001, 9 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.

Binhammer, Richard "In Depth: Dell" Dell, Inc., http://blog.fluentsimplicity.com/twitter-brand-index/dell/, Aug. 2008, pp. 1-3.

Chavez, David, et al., "Avaya MultiVantage Software: Adapting Proven Call Processing for the Transition to Converged IP Networks," Avaya, Inc., Aug. 2002.

Coles, Scott, "A Guide for Ensuring Service Quality in IP Voice Networks," Avaya, Inc., 2002, pp. 1-17.

Damerau, Fred, "Generating and evaluation domain-oriented multi-word terms from texts," Information Processing and Management 29(4):433-447, 1993.

Dawson, "NPRI's Powerguide, Software Overview" Call Center Magazine (Jun. 1993), p. 85.

Doo-Hyun Kim et al. "Collaborative Multimedia Middleware Architecture and Advanced Internet Call Center," Proceedings at the International Conference on Information Networking (Jan. 31, 2001), pp. 246-250.

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.

Eliason, Frank "Background Noise: Musings on Internet Media, Technology, and Pretty Much Whatever Else I Feel Like" http://kzimmerman.typepad.com/background_noise/2008/04/dear-comcast-i.html, Apr. 7, 2008, pp. 1-3.

Foster, Robin, et al., "Avaya Business Advocate and its Relationship to Multi-Site Load Balancing Applications," Avaya, Inc., Mar. 2002, 14 pages.

Geotel Communications Corporation Web site printout entitled "Intelligent CallRouter" Optimizing the Interaction Between Customers and Answering Resources., 1998, 6 pages.

Ives, Bill "Radian6—Monitoring Social Media" The {App} Gap, http://www.theappgap.com/radian6—monitoring-social-meida.html, Nov. 10, 2008, pp. 1-14.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

L.F. Lamel and J.L. Gauvain, Language Identification Using Phone-Based Acoustic Likelihood, ICASSP-94, date unknown; 4 pages.

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.

Levent M. Arsian, Foreign Accent Classification in American English, Department of Electrical Computer Engineering, Duke University, Thesis, pp. 1-200 (1996).

MIT Project Oxygen, Pervasive, Human-Centered Computing (MIT Laboratory for Computer Science) (Jun. 2000) pp. 1-15.

Perez, Sara "Read Write Web: How to Get Customer Service Via Twitter" http://www.readwriteweb.com/archives/how_to_get_customer_service_via_twitter.php, Apr. 10, 2008, pp. 1-14.

Presentation by Victor Zue, The MIT Oxygen Project, MIT Laboratory for Computer Science (Apr. 25-26, 2000) 9 pages.

RADIAN6 company website, http://www.radian6.com/cms/home, Printed Aug. 7, 2009; 1 page.

Stevenson et al.; "Name Resolution in Network and Systems Management Environments"; http://netman.cit.buffalo.edu/Doc/DStevenson/NR-NMSE.html; printed Mar. 31, 2003; 16 pages.

http://support.avaya.com/japple/css/japple?PAGE+ProductIndex; printed Mar. 17, 2006; 11 pages.

http://www.ultratec.com/captel/; printed Feb. 24, 2006; 2 pages.

http://www.captionedtelephone.com/how-it-works.phtml; printed Feb. 24, 2006; 2 pages.

http://www.captionedtelephone.com/faqs.phtml; printed Feb. 24, 2006; 6 pages.

http://www.avaya.com/gcm/master-usa/en-us/products/offers/5400_series_digital_telephone.htm&View=ProdDesc; printed Mar. 17, 2006; 2 pages.

Avaya 5400 Series Digital Telephones Fact Sheet; 2 pages, 2005.

Avaya 5400 Series Digital Telephones Product Features Sheet; 4 pages, 2006.

Avaya Digital & IP Telephones Fact Sheet; 2 pages, 2005.

The 6402 and 6402D Telephones Instruction Sheets; 20 pages.

AT&T The 8400-Series Voice Terminals; Instructions for Installation, Switch Administration, and Programming the Options; Issue 2, Jan. 1996; 886 pages.

* cited by examiner

TELEPHONE-BASED USER INTERFACE FOR PARTICIPATING SIMULTANEOUSLY IN MORE THAN ONE TELECONFERENCE

FIELD OF THE INVENTION

The invention relates generally to telecommunications and particularly to teleconferencing.

BACKGROUND OF THE INVENTION

A telephone or audio conference (hereinafter "teleconference") enables multiple teleconference participants to hear and be heard by all other participants to the teleconference.

Chiefly for the benefit of people who are deaf or hard-of-hearing, techniques have been developed that permit the text captions of a telephone call or teleconference to be displayed in close to real-time on appropriately equipped telephony endpoints. An illustrative example is the CapTel™ system by Ultratec. Users of this service may listen to a telephone call or teleconference while simultaneously reading the captions on their telephone's display. The captions are generated by a centralized relay center operated by Ultratec, using Speech-To-Text or STT recognition software corrected by a human reviewer. Communication between the Ultratec relay center and the end-user is via standard analog phone lines.

Within the emerging field of Voice over Internet Protocol telephony, international standards that support the intermixing of voice and text on the same call have already been proposed and adopted. Concurrently, automated captioning services, such as those offered by Ultratec, are becoming more sophisticated and less expensive. Although intended originally for the deaf and hard-of-hearing community, there is no legal, regulatory, or technical reason why such capabilities should not be used to address the needs of others.

There is a need for a teleconferencing system that allows participants to participate in multiple conference calls simultaneously. In particular, there is a need to provide this capability to users of traditional, current-generation analog telephones, digital telephones, IP hardphones and IP softphones. The reason for this need is that, when there is more than one simultaneously occurring teleconference of interest, a participant must choose which conference to attend, or must hop back-and-forth among the conferences. Items of potential interest, that are presented while an individual is in the "wrong" conference, will be discussed without that individual's participation and, possibly, without that individual's knowledge.

SUMMARY OF THE INVENTION

These and other needs are addressed by the various embodiments and configurations of the present invention. The present invention is directed generally to the simultaneous or substantially simultaneous provision of text and voice streams from different calls to the same communication device.

In a first embodiment of the present invention, a teleconferencing method is provided that includes the steps of:

(a) when a first call is on hold and a second call is active on a selected communication device, the selected communication device displays a first text representation of a first voice stream received from a first set of endpoints involved in the first call; and (b) the selected communication device simultaneously and audibly plays a second voice stream received from a second set of endpoints involved in the second call. During the performance of steps (a) and (b), the selected communication device does not receive one or both of the first voice stream and a second text representation of the second voice stream.

In a second embodiment, a teleconferencing method is provided that includes the steps of:

(a) receiving, from the selected communication device, a first command to put a first call on hold, the first call being between the selected communication device and a first set of endpoints;

(b) placing the first call on hold;

(c) while the first call is on hold, providing to the selected communication device for visual display a first text representation of a first voice stream received from the first set of endpoints; and (d) while the first call is on hold, providing to the selected communication device for audible play a second voice stream received from a second set of endpoints, the second set of endpoints being involved in a second call with the selected communication device and the first and second calls being independent of one another.

The selected communication device can be an analog, digital, or IP communication device. As will be appreciated, an analog telephone uses a continuous signal that uses the entire range of voltages while a digital telephone transmits specific discrete voltage values of "1" and "0" to transmit information. An analog voice waveform is converted into its digital equivalent using pulse-code modulation.

The present invention can provide a number of advantages depending on the particular configuration. The invention can provide a teleconferencing system that allows participants to participate in multiple conference calls simultaneously using not only IP softphones but also IP hardphones and digital and analog phones. When there is more than one simultaneously occurring teleconference of interest, a participant can avoid having to select which conference to attend or hopping back-and-forth among the conferences without receiving any feedback as to what is happening on the call on-hold. Conventional analog, digital, and IP phones can be readily adapted to the present invention. For conventional analog and digital phones for example, the responsibility for decoding the text packets and populating the phone's display resides on the switch rather than on the phone itself. By locating the intelligence for the present invention on the switch, the simultaneous streaming of text and voice from different phone calls can be readily effected.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Communication System

The invention will be illustrated below in conjunction with an exemplary communication system. Although well suited for use with, e.g., a system having a private branch exchange (PBX) or other similar contact processing switch, the invention is not limited to use with any particular type of communication system switch or configuration of system elements. Those skilled in the art will recognize that the disclosed techniques may be used in any communication application in which it is desirable to provide improved contact processing directed from an external network into a PBX or other communication system switch. The term "contact" or "call" as used herein is intended to include any live voice communications, whether circuit switched or packet switched.

Figure 1:
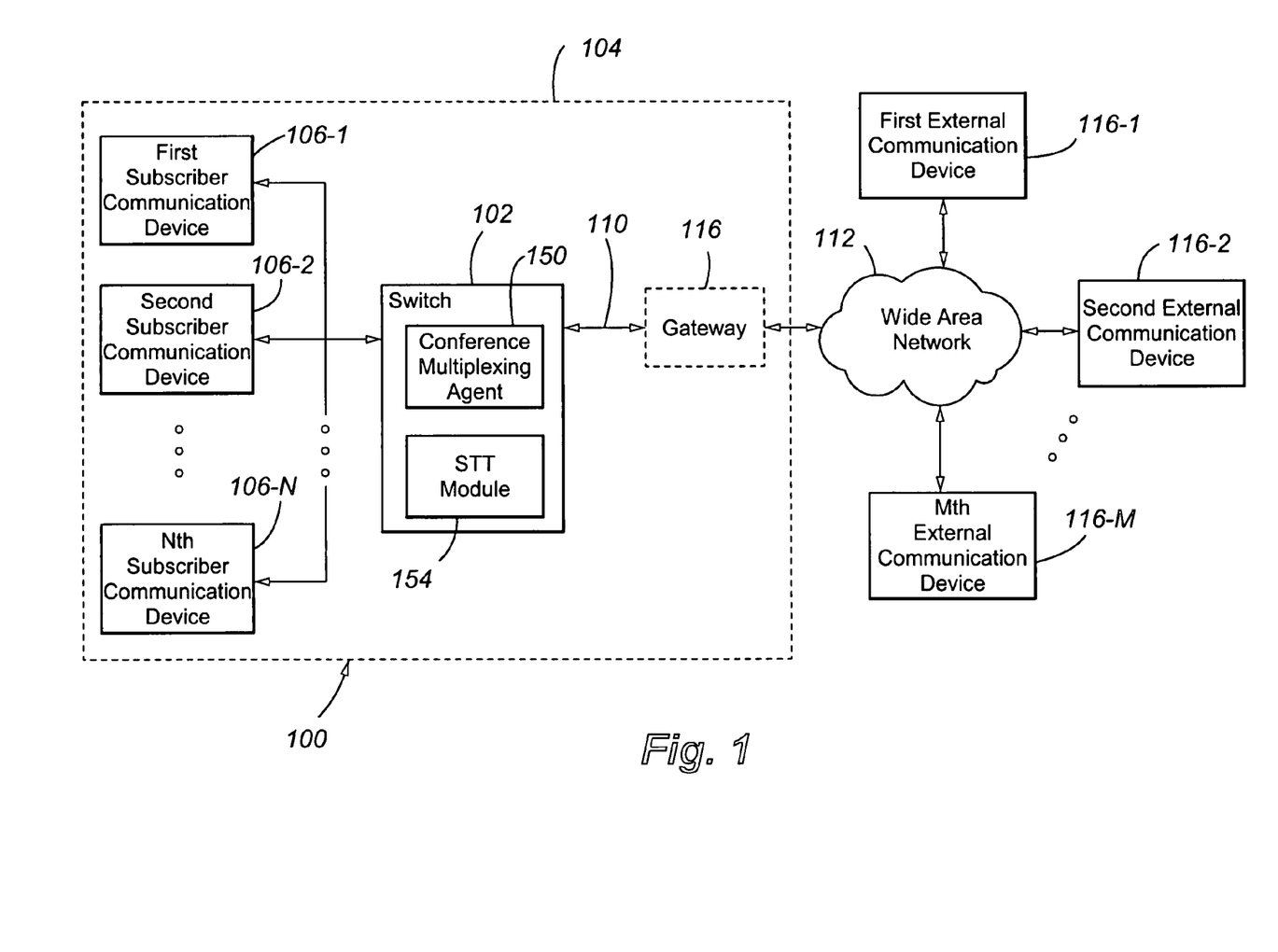
FIG. 1 is a block diagram of a telecommunications architecture according to an embodiment of the present invention.

FIG. 1 shows an exemplary communication system 100 in which the invention is implemented. The system 100 includes a switch 102 which serves a premises 104 having a number of communication devices 106-1, 106-2, . . . 106-N that are subscribers to the switch 102. Each of the terminals 106-1, 106-2, . . . 106N corresponds to one of a set of internal extensions Ext1, Ext2, . . . ExtN, respectively. These extensions are referred to herein as "internal" in that they are extensions within the premises 104 that are directly serviced by the switch. More particularly, these extensions correspond to conventional terminal endpoints serviced by the switch, and the switch can direct incoming calls to and receive outgoing calls from these extensions in a conventional manner.

The term "switch" as used herein should be understood to include a PBX, an enterprise switch, or other type of telecommunications system switch, as well as other types of processor-based communication control devices such as servers, computers, adjuncts, etc. By way of example, the switch 102 in the exemplary embodiment may be implemented as an otherwise conventional DEFINITY™ or MULTIVANTAGE™ Enterprise Communication Service (ECS) communication system switch available from Avaya Inc. Other types of known switches are well known in the art and therefore not described in detail herein.

The communication devices 106 may be wired desktop telephone terminals or any other type of terminals capable of communicating with the switch 102. The word "terminal" as used herein should therefore be understood to include not only wired or wireless desktop telephone terminals but also other types of processor-based communication devices, including without limitation IP softphones, IP hardphones, mobile telephones, personal computers, laptops, personal digital assistants (PDAs), etc.

The switch 102 is also coupled via one or more communication lines 110 to a network 112. In one configuration, the communication lines are trunk lines and the network is the public switched telephone network (PSTN). In another configuration, the communication lines pass through an optional gateway 116 to a packet-switched network 112, such as the Internet. In any event, the lines 110 carry incoming contacts from the network 112 to the switch 102 for processing and carry outgoing contacts from the switch 102 to the network 112. The network 112 is coupled via the network 112 to communication devices 116-1, 116-2, . . . 116-M. Preferably to permit effective mapping by the switch, the wireless networks or other transit networks between the user's external terminal and corresponding internal terminal are configured such that the switch receives not only the intended destination address but also the source address or identity of the external device initiating the contact.

It should be noted that the invention does not require any particular type of information transport medium between switch 102 and terminals 116, i.e., the invention may be implemented with any desired type of transport medium as well as combinations of different types of transport media.

Each of the communication devices 116-1, 116-2, . . . 116-M represents an external terminal not corresponding to any internal extension of the switch 102. These terminals are referred to as "external" in that they are not directly supported as terminal endpoints by the switch 102. Like the terminals 106, the terminals 116 may be wired or wireless desk sets, mobile telephones, personal computers, PDAs, etc. The terminals 116 are an example of devices more generally referred to herein as "external endpoints." As will be appreciated, the present invention can be implemented using any desired type of external endpoint and network connection.

As will be described in greater detail below, the present invention in accordance with an embodiment of the present invention configures the switch 102 such that one or more of the external terminals 116 are treated substantially as internal switch extensions. Advantageously, this allows a given external terminal to access at least a subset of the desirable contact processing features provided by the switch 102.

It should be emphasized that the configuration of the switch, user terminals, and other elements as shown in FIG. 1 is for purposes of illustration only and should not be construed as limiting the invention to any particular arrangement of elements.

The switch 102 in one implementation includes a processor (not shown), memory (not shown), a database (not shown), one or more interfaces (not shown), a switch fabric (not shown), and a set of service circuits (not shown). The processor may be implemented as a central processing unit (CPU), microprocessor, application-specific integrated circuit (ASIC) or other type of digital data processor as well as various portions or combinations of such elements. The memory may be a random access memory (RAM), a read-only memory (ROM), or combinations of these and other types of electronic memory devices.

The processor operating in conjunction with the memory executes one or more software programs depicted in FIG. 1 as the conference multiplexing agent 150 and the Speech-To-Text recognition module 154.

The multiplexing agent 150 controls the text and audio streams provided to the subscriber communication devices 106. In teleconference calls, the agent 150 provides automatically a text representation (or text captioning) of participant speech on a monitored conference when the subscriber places the teleconference call on hold. This is normally done by activating a set of one or more activators (e.g., buttons) on a desk set. As used herein, an "activator" refers to the user interface controls on a communication device that permits the user to effect a selected operation (e.g., activate a feature, dial a number, etc.) of the communication device. Although the interface controls typically are implemented as a plurality of buttons, they may be implemented in many other forms, such as a touch screen, toggles, a pointer device such as a mouse, and combinations thereof. When the set of activators is activated, the text captioning of the on-hold or inactive conference call starts streaming to the communication device's display. Stated another way, the subscriber can toggle back-and-forth between audio and text representations of participant speech on different conference calls, and thereby participate simultaneously in both conference calls, simply by activating the set of feature activators and specifying which of the calls will be placed on hold. As will be appreciated, at any one time, one conference call will be on hold and the other active as the communication device has only one display and one speaker. In one configuration, text captioning is initiated when the subscriber activates a selected activator after the switch receives a command to place the call on hold. There will likely be instances where the subscriber desires to disable text captioning, such as when the call is placed on hold so that the subscriber can initiate another call.

The STT module 154 is conventional. For example, it can be any number of commercially software packages, such as IBM's ViaVoice Telephony™, Dragon Systems DragonDictate™, or other suitable software, such as software using "speaker adaptive" technologies. As will be appreciated, speaker adaptive speech recognition software maintains personal training data for each user. The speech recognition can then be performed on a user's local computer (rather than at the switch) or the system may be adapted to the user's personal training data. Typically, the STT module is speaker independent; that is, it is not configured for a particular user. A human operator can review and edit the transcription, depending on the accuracy of the STT module. In one configuration, each transcript is associated with a speaker identifier. In this configuration, the speaker's identity is displayed at a selected point before, during, or after the display of the text transcript of his or her speech on the monitoring internal communication device 106. As will be appreciated, the STT module may be contained in an adjunct processor.

The service circuits may include tone generators, announcement circuits, etc. These circuits and the interfaces are controlled by processor in implementing call processing functions in the switch.

The switch may include additional elements that are omitted from FIG. 1 for simplicity and clarity of illustration. For example, the switch may include a port card for each type of user terminal associated therewith. In addition, it will be appreciated by those skilled in the art that the switch 102 may be configured to support multiple user terminals of different types, e.g., wired desk set terminals, wireless desk set terminals, personal computers, video telephones or other advanced terminals, etc.

Also associated with the switch 102 may be an administrator terminal (not shown) that is used to program the operation of the switch 102 during a system administration, e.g., an initial set-up and configuration of the system of a subsequent system-level or user-level configuration.

Other devices not shown in the figures may be associated with the switch 102, such as an adjunct feature server. Such an adjunct may be physically incorporated within the switch and may be partially or completely implemented using other switch elements such as processor and memory.

Figure 2:
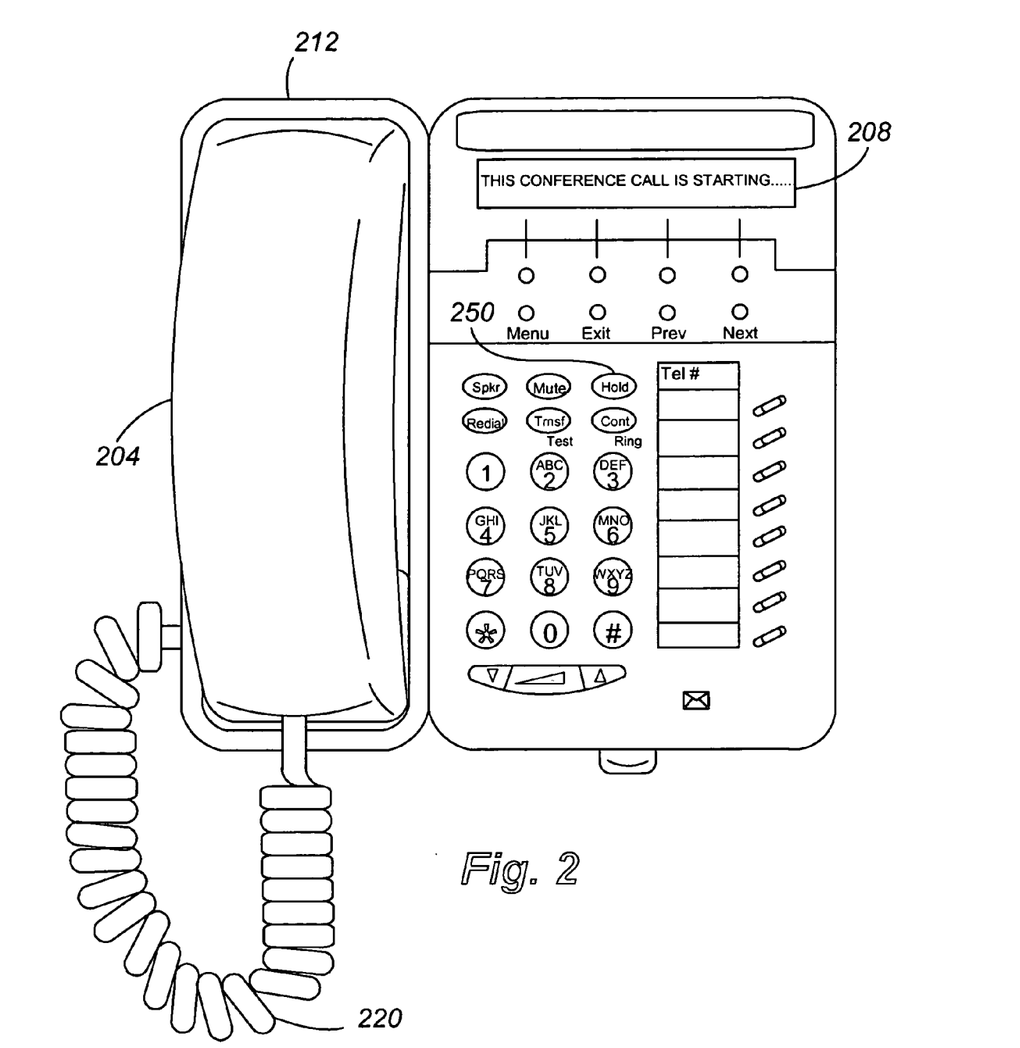
FIG. 2 is a plan view of a telecommunications device according to an embodiment of the present invention.

A subscriber communication device 106, according to an embodiment of the present invention, is depicted in FIG. 2. The device includes a handset 204 and/or headset (not shown), optionally a processor and memory (not shown), a duplexed speaker (not shown), a microphone (not shown), and a character display 208. The handset 204 is received in a cradle 212 positioned on the communication device's outer housing. A pair of electroacoustic transducers, a mouthpiece microphone and an earpiece speaker are located in the handset. Typically, a sidetone circuit allows some of the transmitted energy to be fed back to the receiver. The handset is connected wirelessly or by a flexible electrical cable 220 to circuitry within the housing. The duplexed speaker is located in the body of the communication device.

The character display is generally a Liquid Crystal Display or LCD that is limited in size. At a minimum, the alphanumeric display of a typical PBX-connected telephone will permit at least two lines of text, 24 characters per line, to be presented. As part of the recent trend toward adding Internet browser functionality to telephones, displays of considerably higher capacity are becoming more common, illustrative examples being the Avaya Model 2420 digital telephone and the Avaya Model 4625 IP telephone. It is generally not enabled to display graphics or media-rich images. As can be seen, the display 208 is in the process of receiving a text representation of a conference participant's voice for an on hold conference call. The text representation states "This conference call is starting . . . "

The communication device includes a number of activators, such as pushbutton keys. The activators include soft keys, volume control button(s), and call appearance/feature buttons. Activator 250 is the on-hold button. The remaining activators are self-explanatory. Administration and ongoing maintenance, including key/button labeling, of the communication device can be performed automatically by the switch.

The communication device 106 can have any connection interface to the switch 102. Typical interfaces include a two- or four-wire (twisted pair) input or output interface. Two-wire transmission is where both the transmit and receive paths are carried on the same wire pair or other single medium. Four-wire transmission is where the transmit and receive paths are separate and a wire pair is assigned to each path. As will be appreciated, two wires can be a tip or ring interface. The device 106 is generally connected to the switch via a standard telephone jack (not shown).

When the user of a traditional PBX-connected telephone presses the HOLD button or dials the appropriate DTMF feature access code, the phone is put on hold not because of a change that takes place within the phone itself, but instead because the PBX that controls the telephone has received and obeyed a command to change the manner in which it sends (or doesn't send) signals to that phone.

Exemplary analog, digital, and IP telephones that can be used for the communication device include the Avaya, Inc., 2400, 2500, 4400, 4600, 5400, 5600, 6200, 6400 7100, 7300, 7400, 8100, 8400, 9100, and 9400 series telephones, Avaya, Inc., 3810 and 3910 wireless telephones, Avaya, Inc., ISDN 7500 and 8500 series telephones, Merlin Legend telephones, Merlin ETR/MLS and MLX series telephones, Partner telephones, Partner MLS series telephones, Avaya, Inc., single line business telephones, Avaya, Inc., and SIP softphone. The display may be augmented using an expansion unit, such as the EU24 by Avaya, Inc.

A particular preferred telephone is a circuit-switched digital telephone, such as a Digital Control Protocol enabled telephone of Avaya, Inc. As will be appreciated, the DCP is used in a time division multiplexed architecture. In DCP, control signals from the controlling switch are generally not part of the voice path. In other words, DCP generally uses different channels for controlling the communication device display and conveying the incoming and outgoing voice streams. Stated another way, DCP typically uses out-of-band signaling for controlling operations of the subscriber communication device and in-band signaling for conveying the incoming and outgoing voice streams. In a four-wire interface, two of the wires may be used for analog voice communications (incoming and outgoing voice communications respectively) and two for digital control signaling. Although DCP is discussed, it is to be understood that other digital protocols may be used.

As will be appreciated, in packet-switched communications, particularly VoIP communications, various standards organizations have proposed IP mechanisms by which voice and conversational text can be intermixed in the same phone call. For example, ITU-T Recommendation T.140 and RFC 4103 describe a mechanism by which voice and text are intermixed. Additionally, concurrent intermixing of text and voice is currently supported by Avaya Inc.'s TTY-on-VoIP architecture, in which text is transported on VoIP networks as RFC2833-format descriptions of the corresponding Baudot TTY tones. Unlike DCP, control signals and voice stream data is conveyed along the same channel, or in-band, using different types of packets (i.e., using different packet headers).

Figure 3:
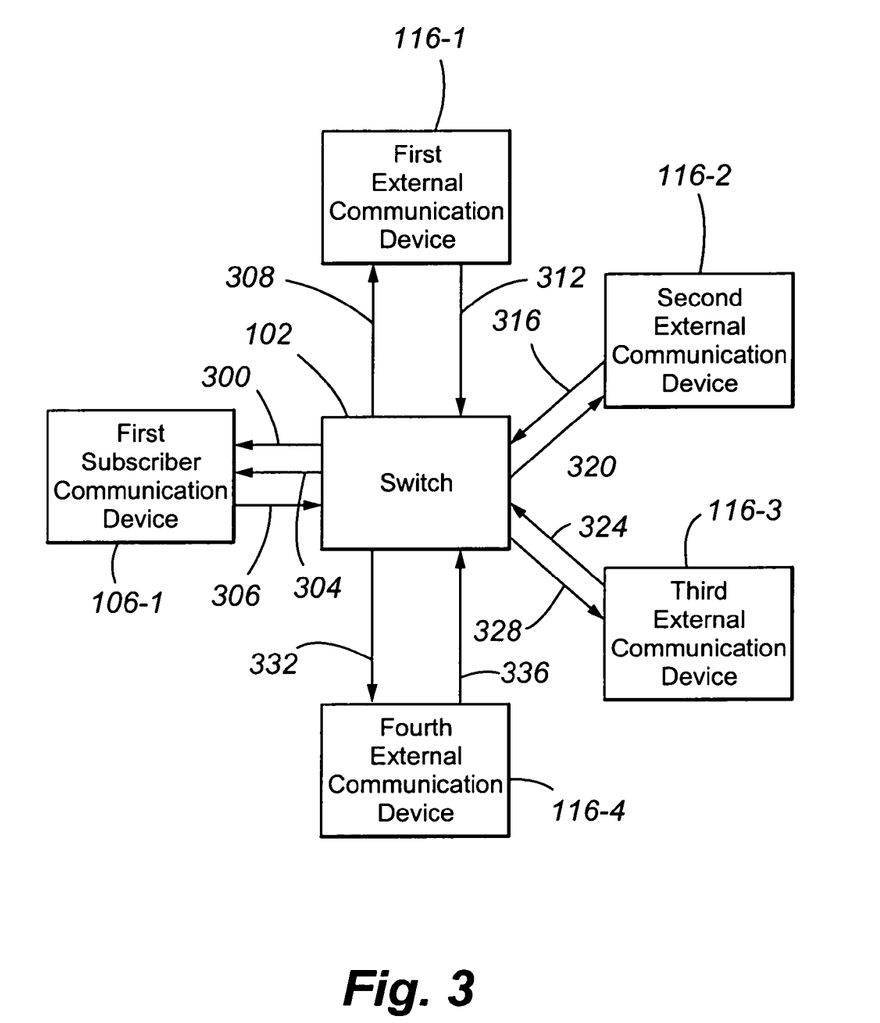
FIG. 3 is a block diagram of a telecommunications architecture according to an embodiment of the present invention.

FIG. 3 depicts the signal flows according to an embodiment of the present invention. For purposes of illustration, assume that there are two concurrent conference calls involving the first subscriber communication device 106-1. The first conference call is among the first subscriber communication device 106-1, the first external communication device 116-1, and the second external communication device 116-2. The second conference call is among the first subscriber communication device 106-1, the third external communication device 116-3, and the fourth external communication device 116-4. The first subscriber communication device 106-1 receives a text stream 300 and an audio or voice stream 304 and outputs audio stream 306. The first external communication device receives an audio stream 308 (which is the combined audio streams of the first subscriber communication device 106-1 and the second external communication device 116-2) and outputs an audio stream 312; the second device 106-2 receives an audio stream 320 (which is the combined audio streams of the first subscriber communication device 106-1 and the first external communication device 116-1) and outputs an audio stream 316; the third device 106-3 receives an audio stream 328 (which is the combined audio streams of the first subscriber communication device 106-1 and the fourth external communication device 116-4) and outputs an audio stream 324; and the fourth device 106-4 receives an audio stream 332 (which is the combined audio streams of the first subscriber communication device 106-1 and the third external communication device 116-3) and outputs an audio stream 336. Further assume that, in a first operational mode of the subscriber communication device 106-1, the first conference call is on hold and the second conference call is active, and, in a second operational mode, the second conference call is on hold and the first conference call is active. In the first operational mode, the text channel 300 contains the text representations of the voice streams 312 and 316 and voice channel 304 contains the audio representations of the voice streams 324 and 336. In the second operational mode, the text channel 300 contains the text representations of the voice streams 324 and 336 and voice channel 304 contains the audio representations of the voice streams 312 and 316. In either operational mode, the text and audio streams correspond to different calls; that is to say, it is typically not the case that text and audio streams corresponding to each call will be received concurrently by the subscriber's communication device The first subscriber communication device switches between the first and second operating modes by the subscriber pressing a set of activators, which typically includes the on-hold button. To make the switch between operating modes seamless to the subscriber, the STT module 154 is typically converting each of the incoming audio streams to text regardless of which conference call is on hold. In other words, the STT module 154, in the example above, is continuously converting into text each of the voice streams 312, 316, 324, and 336.

The Operation of the Multiplexing Agent

Figure 4:
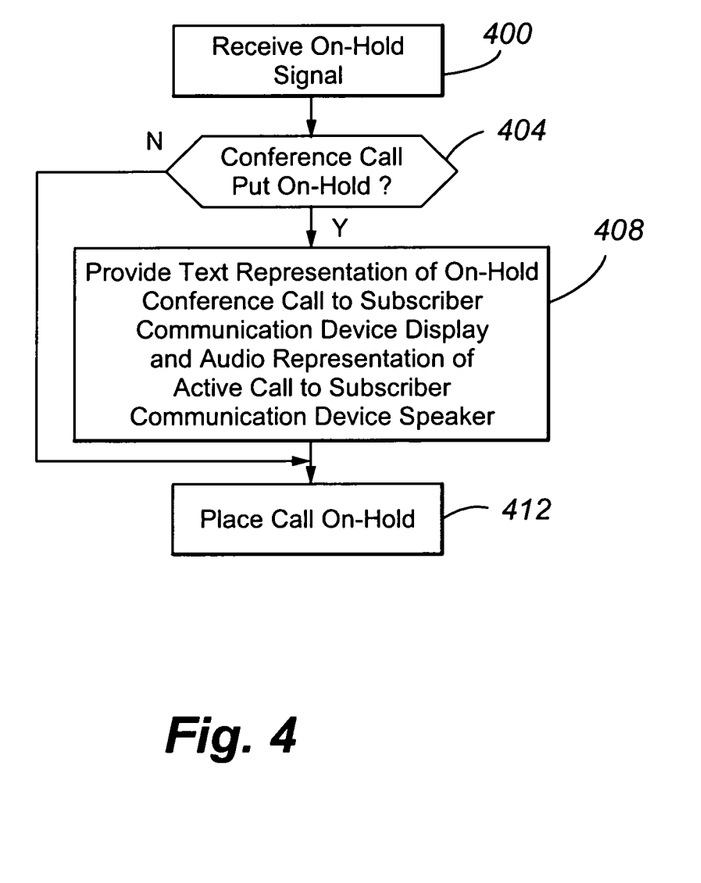
FIG. 4 is a flowchart depicting a method of operation of the conference multiplexing agent according to an embodiment of the present invention.

The operation of the multiplexing agent 150 will now be discussed with reference to FIG. 4.

In step 400, the agent 150 receives a signal from the monitored subscriber's communication device that the on-hold activator has been pressed. For typical analog endpoints, this is typically done by receiving a series of Dual Tone Multi-Frequency or DTMF signals uniquely associated with this activator. (Many manufacturers, including Avaya, refer to analog DTMF signals of this sort as "feature access codes.") In digital and IP endpoints, the indication that the on-hold activator has been pressed is carried as a non-audio transmission, typically via a proprietary digital signaling protocol (such as Avaya DCP) or as readily identifiable IP packets.

In decision diamond 404, the agent 150 determines whether the call that is being placed on hold is a conference call. This can be done, for example, by accessing the data structures associated with the call. A conference call will have at least two other endpoints associated with the call.

When the call being placed on hold is a conference call, the agent 150, in step 408, provides a text representation of the on-hold conference call to the character display of the subscriber's communication device and an audio representation of the active call (which itself may be a conference call) to the speaker of the subscriber's communication device.

When the call being placed on hold is not a conference call or after step 408, the agent 150 updates the data structures associated with the conference call to indicate that it has been placed on hold.

A number of variations and modifications of the invention can be used. It would be possible to provide for some features of the invention without providing others.

For example in one alternative embodiment, the STT module is not located in spatial proximity to the switch. For example, the STT module can be located at each of the endpoints participating in the call or at a central location through which the various audio streams pass, such as in the teleconferencing software.

In another alternative embodiment, more than two teleconferences are monitored at one time. Although support for more than two concurrent teleconferences is possible using the proposed architecture, most users are unable to track more than two conversations at a time.

In yet another alternative embodiment, the server buffers the text stream being streamed to the subscriber communication device. The text stream is normally generated in real- or near-real time. Typically, the reading speed of the subscriber is less than the speech speed of the speaker. To compensate for the disparity, the server buffers the text captioning of the monitored call such that the captioning of the monitored call is not provided in real time to the subscriber's device. When the subscriber toggles to the monitored conference call such that it becomes active, the server can provide the audio equivalent to the buffered text speech at an accelerated rate to bring the subscriber current to the voice conversation taking place on the conference call. This can be done by marking dynamically the voice stream to indicate the point at which the captioning is being streamed to the subscriber's device. Alternatively, the buffered captions can be converted back to speech using a Text-To-Speech module, which are well known in the art, and the synthesized speech provided to the subscriber at an accelerated rate. In one configuration, the subscriber can use a designated set of keys to accelerate or decelerate the rate at which text captions are streamed to the display.

In this embodiment, the activators can be redefined when text streaming is being provided to the corresponding subscriber communication device to provide a "TiVo"-type effect. Activators are defined to provide selected features, such as fast forwarding through and rewinding and pausing the streamed text. The memory of the switch enables the rewinding and fast forwarding features while the switch buffer enables the fast forwarding and pausing features. In this manner, the subscriber can pause the streamed text and/or rewind the streamed text to an earlier point in the text that he or she missed while participating in the active call. Conversely, the subscriber can fast forward through the text to eliminate substantially any gap between the speech and its the streamed text counterpart. In one configuration, the subscriber activates a selected set of activators to enable the redefinition of the activators to provide rewind, fast forward, and pause features. In another configuration, the activators are automatically redefined when a call is placed on hold. In this configuration, the activators are selected so that they will not interfere with the subscriber initiating another call.

In yet another embodiment, multi-lingual captioning is provided. Illustratively, if the conference participants are speaking German, separate conference bridge numbers could be provided for the streaming English captions, the streaming French captions, and so on. In such an environment, an English-speaking conference participant with no fluency in German could call into the audio conference on one line, call into the English text-only conference on a second line, put the second line on hold, return to the first line, and then receive streaming English "sub-titles" while listening to the German speakers. Conventional products, such as the L&H Power Translator Pro™, from Lernout & Hauspie Speech Products N.V. of Belgium, translates text in a first language into text in a second language. A multi-lingual teleconferencing architecture is discussed in U.S. Pat. No. 6,816,468, which is incorporated herein by this reference. In this system, the speech of each teleconference participant is transcribed using voice recognition technology in real or near-real time. The transcribed text is translated into a selected language. The translation is generated in real or near-real time on a word-by-word basis or, alternatively, on a phrase-by-phrase or sentence-by-sentence basis. The translated and transcribed text is displayed for a participant using the established data connection. The transcribed (and possibly translated) text may be displayed in real or near-real time during a participant's speech. Audio translation services are also provided to a participant using text-to-speech software to generate an audio signal from the translated and transcribed text.

In yet another embodiment, the communication device is configured as a web browser and receives streaming text from a Universal Resource Locator or URL accessed by the browser. As will be appreciated, a web server associated with the URL provides the streaming text to the communication device, which displays the received text to the user. In this manner, a user can receive the captions of one conversation while participating by voice in another.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A teleconferencing method, comprising:
   (a) when a first call is on hold and a second call is active on a selected communication device, the selected communication device displaying on a display device a first text representation of a speech-to-text converted first voice stream received from at least a first endpoint involved in the first call, wherein the first text representation is prepared by a telecommunications system switch which decodes text packets that represent the first voice stream, wherein receiving of the first text representation at the selected communication device activates or redefines activators, wherein the activators are user interface controls on the selected communication device that permit a user to effect a selected operation, and wherein the activators allow the telecommunications system switch to provide, by a switch buffer, one or more of pausing, fast forwarding and rewinding of the first text representation; and
   (b) the selected communication device simultaneously and audibly playing a second voice stream received from at least a second endpoint involved in the second call, wherein, during steps (a) and (b), the selected communication device does not receive at least one of the first voice stream and a second text representation of the second voice stream.

2. The method of claim 1, wherein the selected communication device is at least one of an analog telephone, digital telephone, wireless device capable of supporting telephony applications, Voice over Internet Protocol telephone, and computer-based software providing functionality comparable to that of a physical telephony endpoint and wherein the selected communication device comprises (i) at least one of a handset and headset, (ii) a duplexed speaker, and (iii) an alphanumeric character display, and wherein the first text representation is transmitted to the selected communication device in a format that conforms to the operational requirements of the device's alphanumeric display, and the second voice stream is transmitted to the selected communication device in a manner that is compatible with the device's audio requirements.

3. The method of claim 1, wherein, when the first call is on hold and the second call is active, the selected communication device does not receive the first voice stream and the second text representation.

4. The method of claim 1, wherein step (a) is performed only when the first call is a conference call comprising at least two endpoints other than the selected communication device.

5. The method of claim 1, further comprising:
   (c) the switch buffer buffering the first text representation to account for the delay between receipt of the first voice stream by the switch and the transmission of the first text representation to the selected communication device.

6. The method of claim 5, wherein the switch marks the first voice stream to indicate the location in the first text representation that has been transmitted to the selected communication device and further comprising:
   (d) receiving a command to place the second call on hold and make the first call active;
   (e) terminating the transmission of the first text representation and second voice stream to the selected communication device; and
   (f) commencing transmission of the first voice stream and second text representation to the selected communication device, wherein the rate of transmission of the first voice stream is accelerated to account for the difference between the marked location in the first text representation and the current location in the first voice stream received by the switch.

7. The method of claim 5, wherein the user of the selected communication device can at least one of fast forward through the first text representation, rewind the first text representation, and pause the display of the first text representation.

8. A tangible and non-transitory computer readable information storage medium comprising processor executable instructions to cause the performance of the steps of claim 1.

9. A teleconferencing method, comprising:
   receiving, from a selected communication device, a first command to put a first call on hold, the first call being between the selected communication device and at least a first endpoint;
   placing the first call on hold;
   while the first call is on hold, providing to the selected communication device for visual display a speech-to-text converted first text representation of a first voice stream received from the at least a first endpoint, wherein the first text representation is prepared by a telecommunications system switch which decodes text packets that represent the first voice stream, wherein receiving of the first text representation at the selected communication device activates or redefines the activators, wherein the activators are user interface controls on the selected communication device that permit a user to effect a selected operation, and wherein the activators allow the telecommunications system switch to provide, by a switch buffer, one or more of pausing, fast forwarding and rewinding of the first text representation; and
   while the first call is on hold, providing to the selected communication device for audible play a second voice stream received from at least a second endpoint, the at least a second endpoint being involved in a second call with the selected communication device, the first and second calls being independent of one another.

10. The method of claim 9, wherein the selected communication device is at least one of an analog telephone, digital telephone, wireless device capable of supporting telephony applications, Voice over Internet Protocol telephone, and computer-based software providing functionality comparable to that of a physical telephony endpoint and wherein the selected communication device comprises (i) at least one of a handset and headset, (ii) a duplexed speaker, and (iii) an alphanumeric character display, and wherein the first text representation is transmitted to the selected communication device in a format that conforms to the operational requirements of the device's alphanumeric display, and the second voice stream is transmitted to the selected communication device in a manner that is compatible with the device's audio requirements.

11. The method of claim 9, wherein, when the first call is on hold and the second call is active, the selected communication device does not receive the first voice stream and the second text representation.

12. The method of claim 9, wherein the step while the first call is on hold is performed only when the first call is a conference call comprising at least two endpoints other than the selected communication device.

13. The method of claim 9, further comprising:
   the switch buffer buffering the first text representation to account for the delay between receipt of the first voice stream by the switch and the transmission of the first text representation to the selected communication device.

14. The method of claim 13, wherein the switch marks the first voice stream to indicate the location in the first text representation that has been transmitted to the selected communication device and further comprising:
receiving a command to place the second call on hold and make the first call active;
terminating the transmission of the first text representation and second voice stream to the selected communication device; and
commencing transmission of the first voice stream and second text representation to the selected communication device, wherein the rate of transmission of the first voice stream is accelerated to account for the difference between the marked location in the first text representation and the current location in the first voice stream received by the switch.

15. The method of claim 13, wherein the user of the selected communication device can at least one of fast forward through the first text representation, rewind the first text representation, and pause the display of the first text representation.

16. A tangible and non-transitory computer readable information storage medium comprising processor executable instructions to perform the steps of claim 9.

17. A telecommunications switch, comprising:
first and second inputs operable to receive first and second voice streams, respectively, the first and second voice streams being associated respectively with different and concurrent first and second calls, a selected subscriber communication device being a participant in each of the first and second calls;
a speech-to-text module operable to convert the first voice stream into a first textual representation of the first voice stream; and
a multiplexing agent operable to provide simultaneously to the selected subscriber communication device the first textual representation of the first voice stream for visual display on a display device to the subscriber and the second voice stream for audible play to the subscriber, whereby the subscriber can simultaneously participate in the first and second calls, wherein the first textual representation is prepared by a telecommunications system switch which decodes text packets that represent the first voice stream, wherein receiving the first textual representation at the selected subscriber communication device activates or redefines activators, wherein the activators are user interface controls on the selected subscriber communication device that permit a user to effect a selected operation, and wherein the activators allow the switch to provide, by a switch buffer, one or more of pausing, fast forwarding and rewinding of the first textual representation.

18. The switch of claim 17, wherein, when the first voice stream is on hold and the second voice stream is active, the selected communication device does not receive the first voice stream and a second textual representation.

19. The switch of claim 17, wherein streaming of the first textual representation to the selected communication device is performed only when the first voice stream is a conference call comprising at least two endpoints other than the selected communication device.

20. The switch of claim 17, wherein
the switch buffer is operable to buffer the first text representation to account for the delay between receipt of the first voice stream by the switch and the transmission of the first text representation to the selected communication device.

21. The switch of claim 20, wherein the switch marks the first voice stream to indicate the location in the first text representation that has been transmitted to the selected communication device and wherein the switch performs the further operations of:
receiving a command to place the second call on hold and make the first call active;
terminating the transmission of the first text representation and second voice stream to the selected communication device; and
commencing transmission of the first voice stream and second text representation to the selected communication device, wherein the rate of transmission of the first voice stream is accelerated to account for the difference between the marked location in the first text representation and the current location in the first voice stream received by the switch.

22. The switch of claim 21, wherein the user of the selected communication device can at least one of fast forward through the first text representation, rewind the first text representation, and pause the display of the first text representation.

* * * * *